(12) United States Patent
Fukui

(10) Patent No.: US 10,662,570 B2
(45) Date of Patent: May 26, 2020

(54) LAUNDRY TREATMENT APPARATUS AND MAGNETIC GEAR APPARATUS

(71) Applicant: LG ELECTRONICS INC., Seoul (KR)

(72) Inventor: Ikuma Fukui, Seoul (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 15/538,875

(22) PCT Filed: Sep. 25, 2015

(86) PCT No.: PCT/KR2015/010154
§ 371 (c)(1),
(2) Date: Jun. 22, 2017

(87) PCT Pub. No.: WO2016/104919
PCT Pub. Date: Jun. 30, 2016

(65) Prior Publication Data
US 2017/0356118 A1    Dec. 14, 2017

(30) Foreign Application Priority Data
Dec. 24, 2014   (KR) .................. 10-2014-0188513

(51) Int. Cl.
*H02K 7/11*     (2006.01)
*H02K 21/22*    (2006.01)
(Continued)

(52) U.S. Cl.
CPC .............. *D06F 37/30* (2013.01); *H02K 7/11* (2013.01); *H02K 21/22* (2013.01); *H02K 49/102* (2013.01)

(58) Field of Classification Search
CPC ........ D06F 37/30; D06F 37/20; D06F 37/302; H02K 49/102; H02K 7/11; H02K 21/22
(Continued)

(56) References Cited

U.S. PATENT DOCUMENTS

| 10,418,927 B2* | 9/2019 | Calverley ................ H02K 7/11 |
| 2010/0164307 A1* | 7/2010 | Kim ...................... D06F 37/304 |
| | | 310/43 |

(Continued)

FOREIGN PATENT DOCUMENTS

| CN | 101632213 | 1/2010 |
| CN | 103038981 | 4/2013 |

(Continued)

OTHER PUBLICATIONS

European Search Report in European Application No. 15873447.5, dated Aug. 8, 2018, 8 pages.
(Continued)

*Primary Examiner* — John K Kim
(74) *Attorney, Agent, or Firm* — Fish & Richardson P.C.

(57) ABSTRACT

A laundry treatment apparatus and a magnetic gear apparatus are disclosed. The laundry treatment apparatus includes a cabinet (100) defining the appearance of the laundry treatment apparatus, a drum (300) rotatably disposed in the cabinet (100) to contain laundry, and a power unit (600) for rotating the drum (300), wherein the power unit (600) includes a rotating magnetic field generator (680) securely provided in the cabinet (100) to generate rotating magnetic fields, an input magnetic gear part (670) rotatably disposed radially outside the rotating magnetic field generator (680) and including at least one permanent magnet to transfer rotating magnetic fields, a magnetic path formation part (640) disposed radially outside the input magnetic gear, and an output magnetic gear part (620) disposed radially outside the magnetic path formation part (640) and including at least one permanent magnet therein.

14 Claims, 7 Drawing Sheets

(51) Int. Cl.
*H02K 49/10* (2006.01)
*D06F 37/30* (2020.01)

(58) Field of Classification Search
USPC .............................................. 310/99, 156.23
See application file for complete search history.

(56) References Cited

U.S. PATENT DOCUMENTS

| | | | | |
|---|---|---|---|---|
| 2011/0012458 | A1* | 1/2011 | Atallah | H02K 49/102 |
| | | | | 310/103 |
| 2011/0285216 | A1* | 11/2011 | Kurronen | H02K 1/276 |
| | | | | 310/45 |
| 2012/0119509 | A1* | 5/2012 | West | F02B 37/00 |
| | | | | 290/1 C |
| 2015/0171679 | A1* | 6/2015 | Nishiyama | H02K 1/278 |
| | | | | 310/156.07 |
| 2015/0294787 | A1* | 10/2015 | Zlatkov | H01F 1/0552 |
| | | | | 310/156.01 |
| 2016/0056687 | A1* | 2/2016 | Kawashima | H02K 5/145 |
| | | | | 310/83 |
| 2016/0359441 | A1* | 12/2016 | Calverley | H02P 6/00 |
| 2017/0356118 | A1* | 12/2017 | Fukui | H02K 49/102 |

FOREIGN PATENT DOCUMENTS

| | | |
|---|---|---|
| CN | 103346655 | 10/2013 |
| CN | 103973077 | 8/2014 |
| CN | 204013046 U | 12/2014 |
| EP | 2763298 | 8/2014 |
| WO | 2006078114 | 7/2006 |
| WO | 2013/021205 | 2/2013 |
| WO | 2014109268 | 7/2014 |

OTHER PUBLICATIONS

International Search Report in International Application No. PCT/KR2015/010154, dated Dec. 21, 2015, 11 pages (with English translation).

Office Action in Chinese Application No. 201580071012.6, dated Oct. 25, 2018, 25 pages. (with English Translation).

* cited by examiner

[Fig. 1]
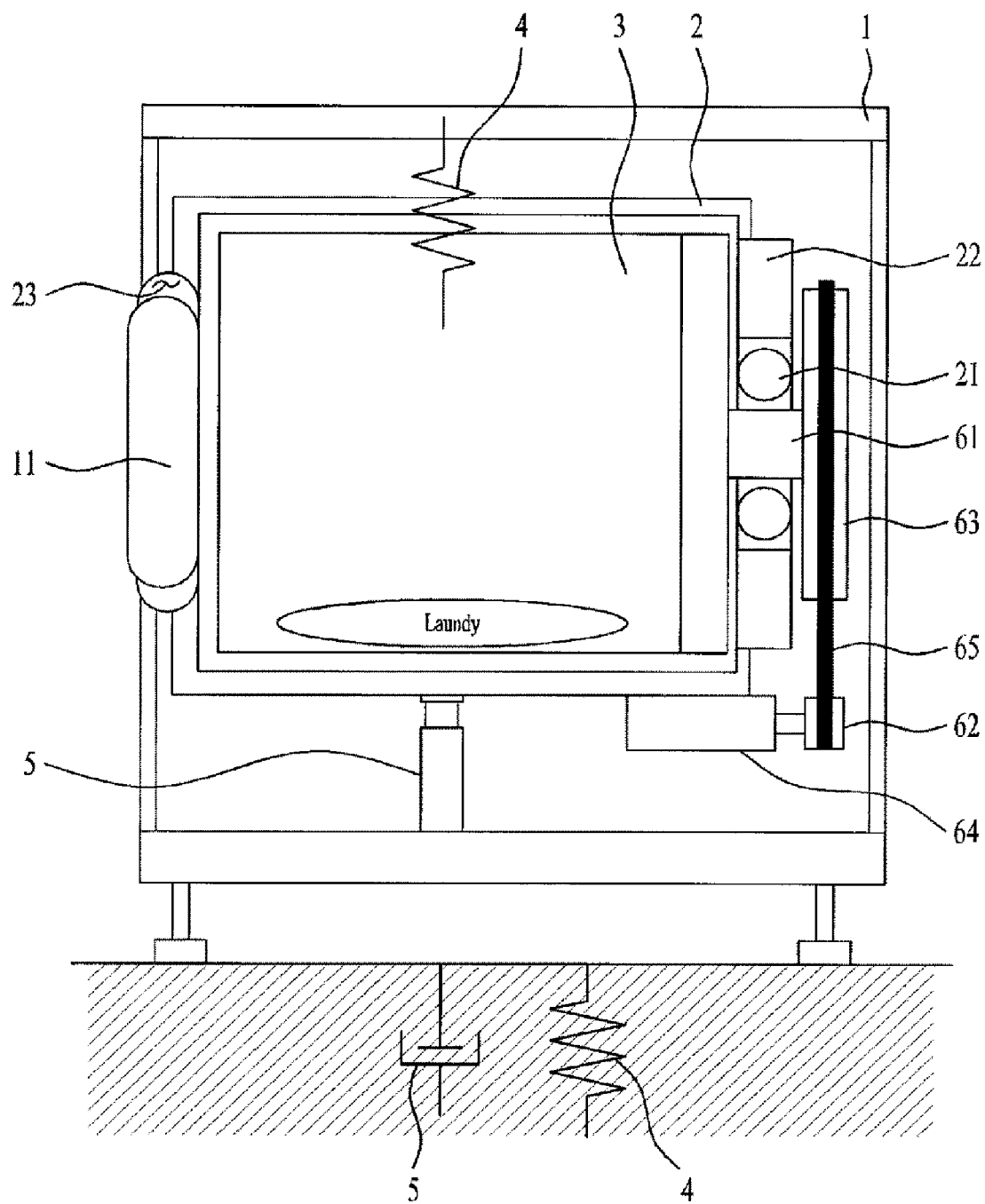

[Fig. 2]
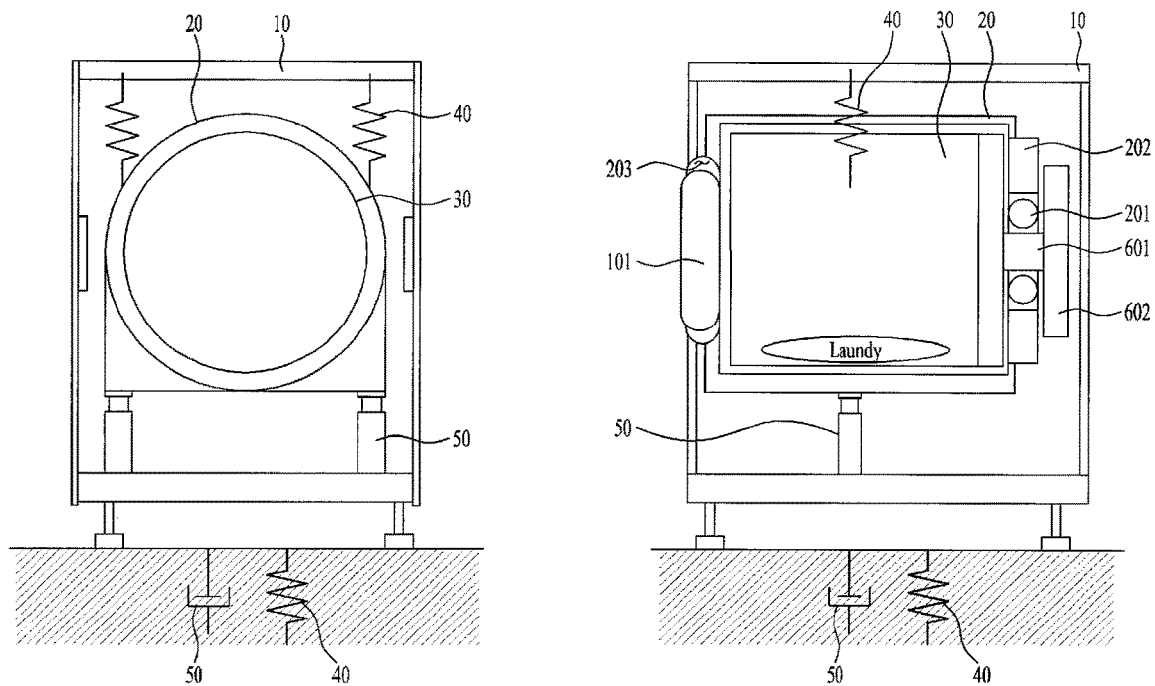

[Fig. 3]
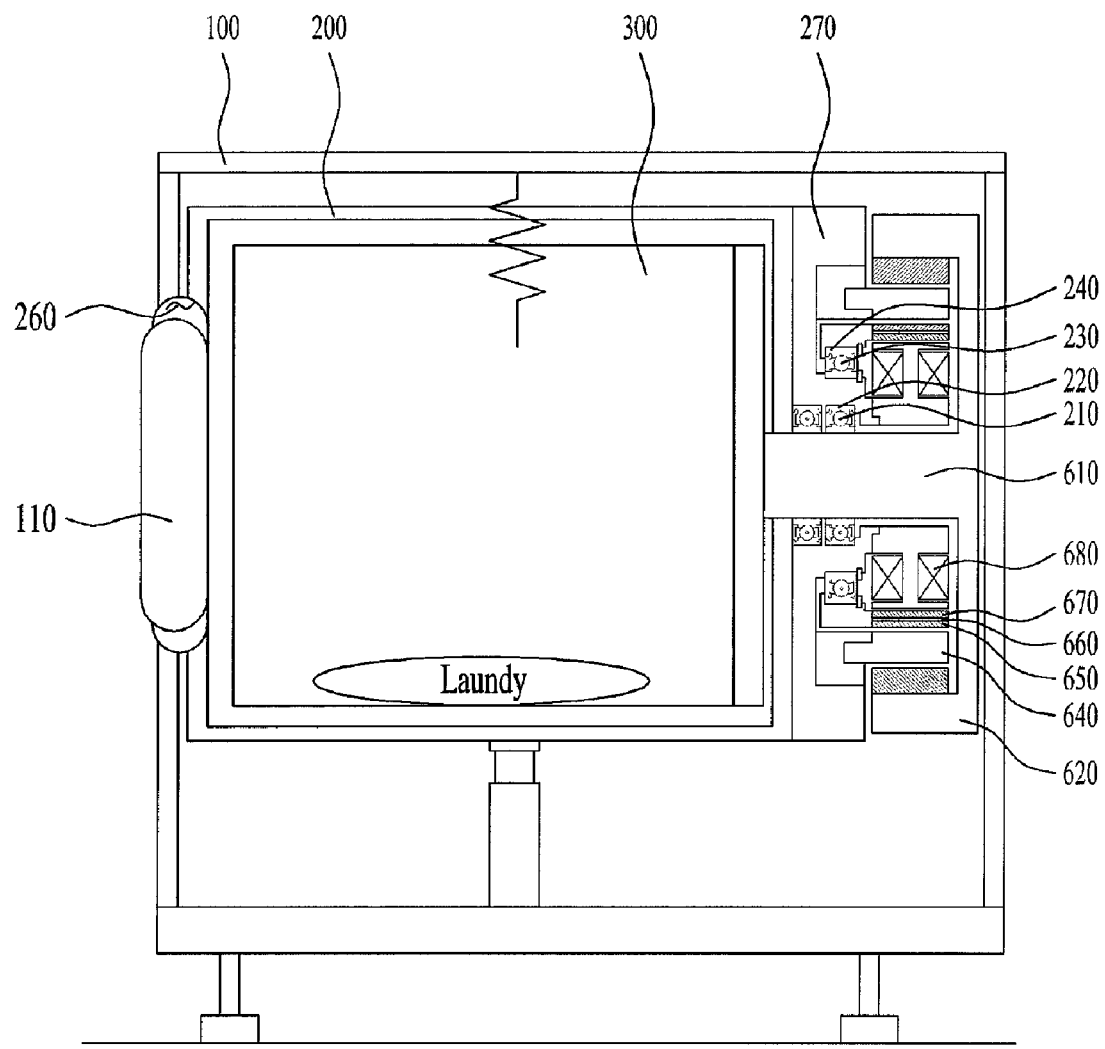

[Fig. 4]
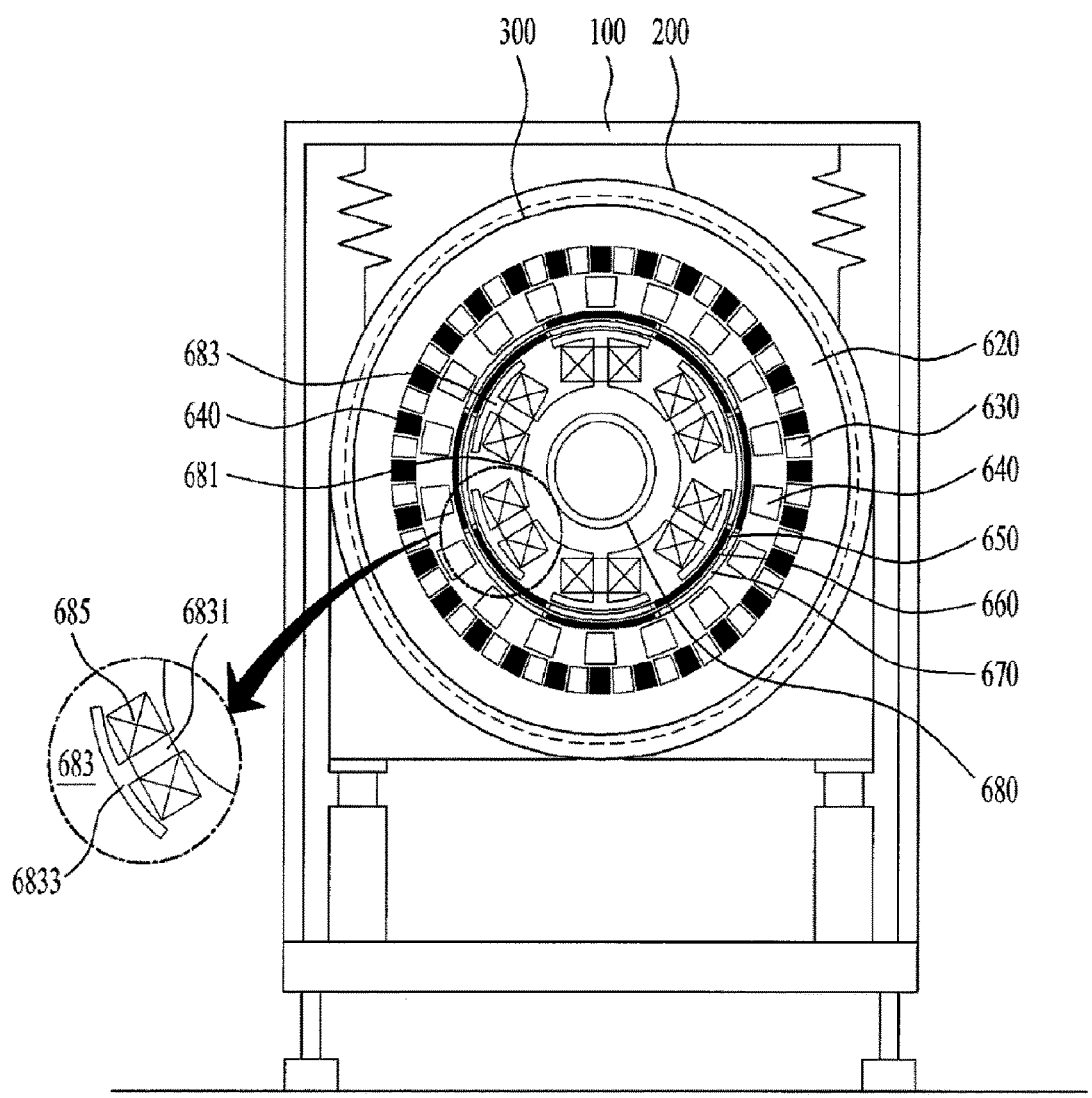

[Fig. 5]
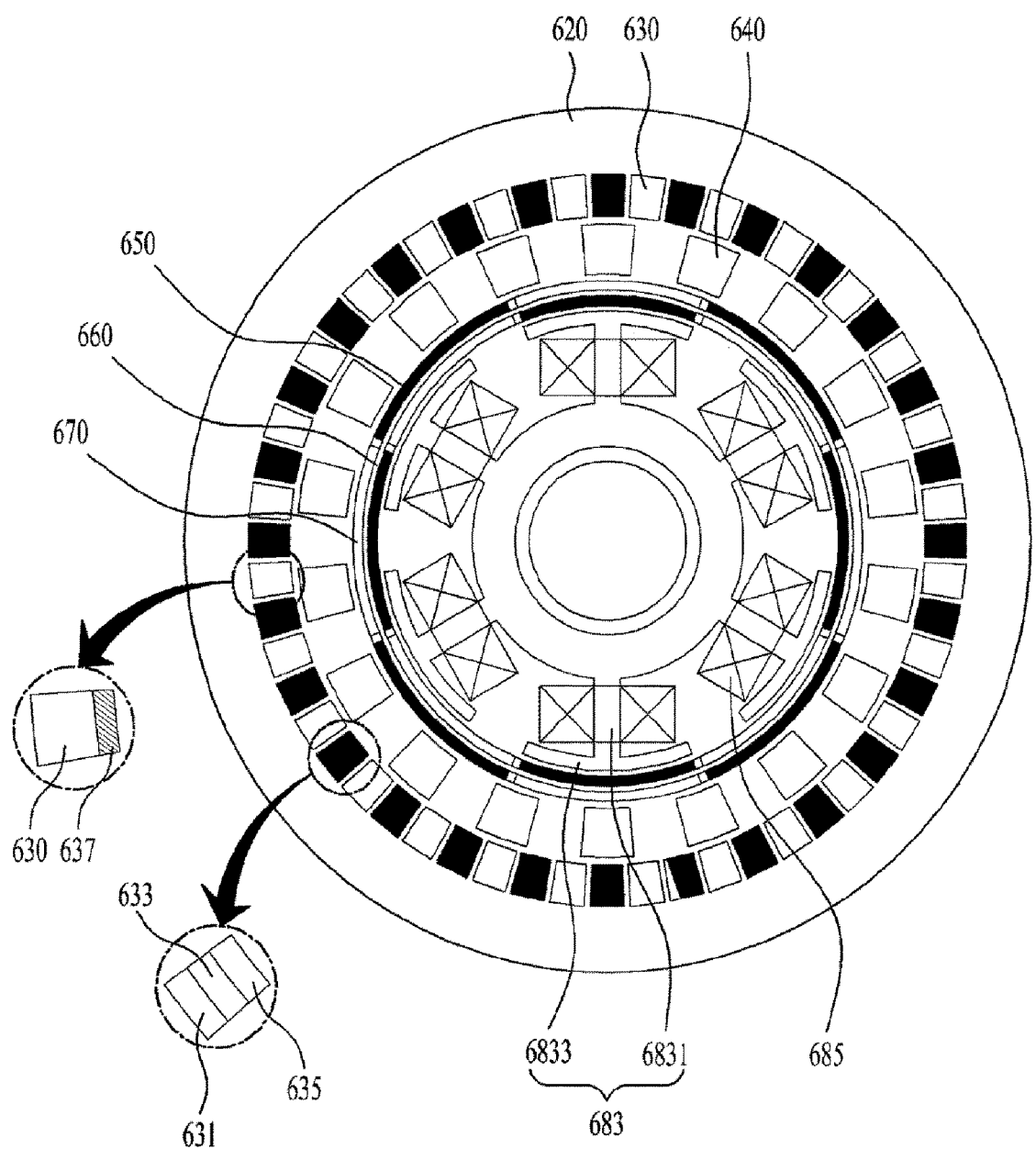

[Fig. 6]
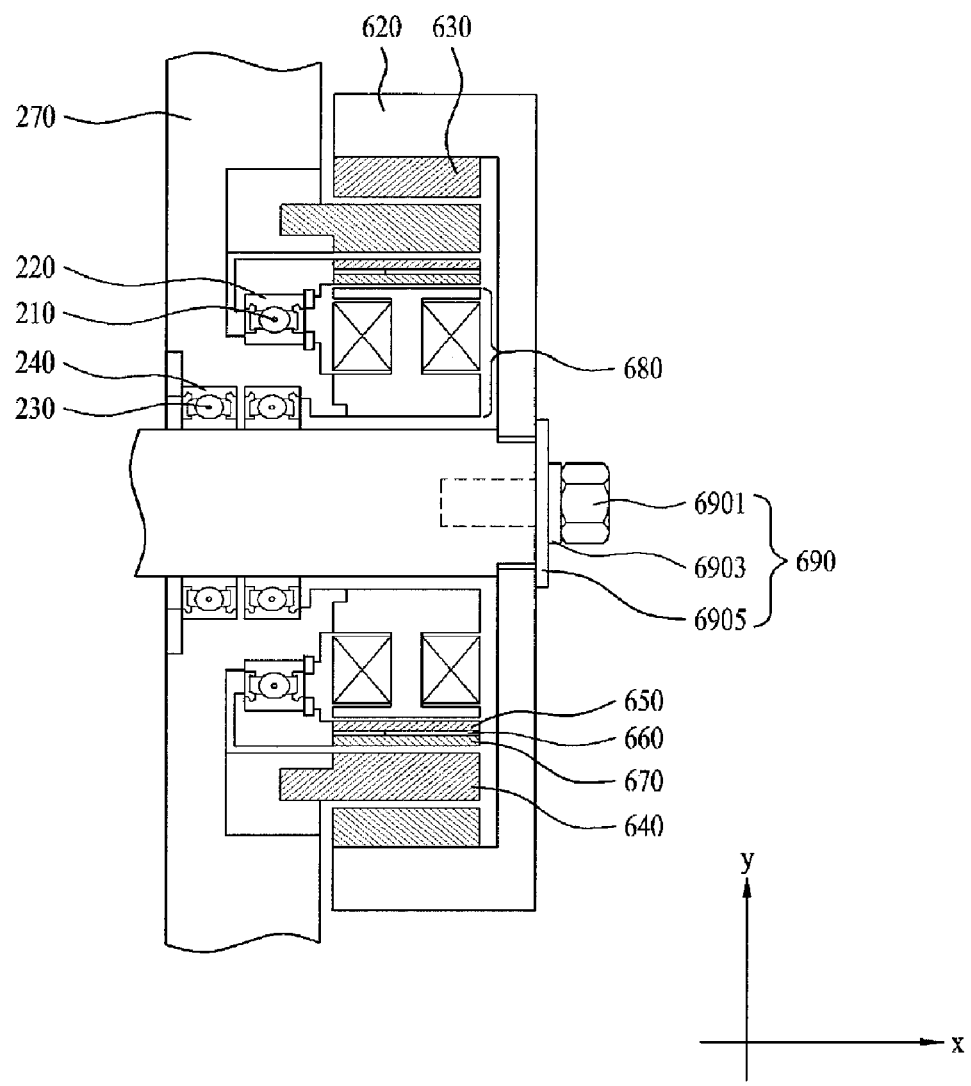

[Fig. 7]
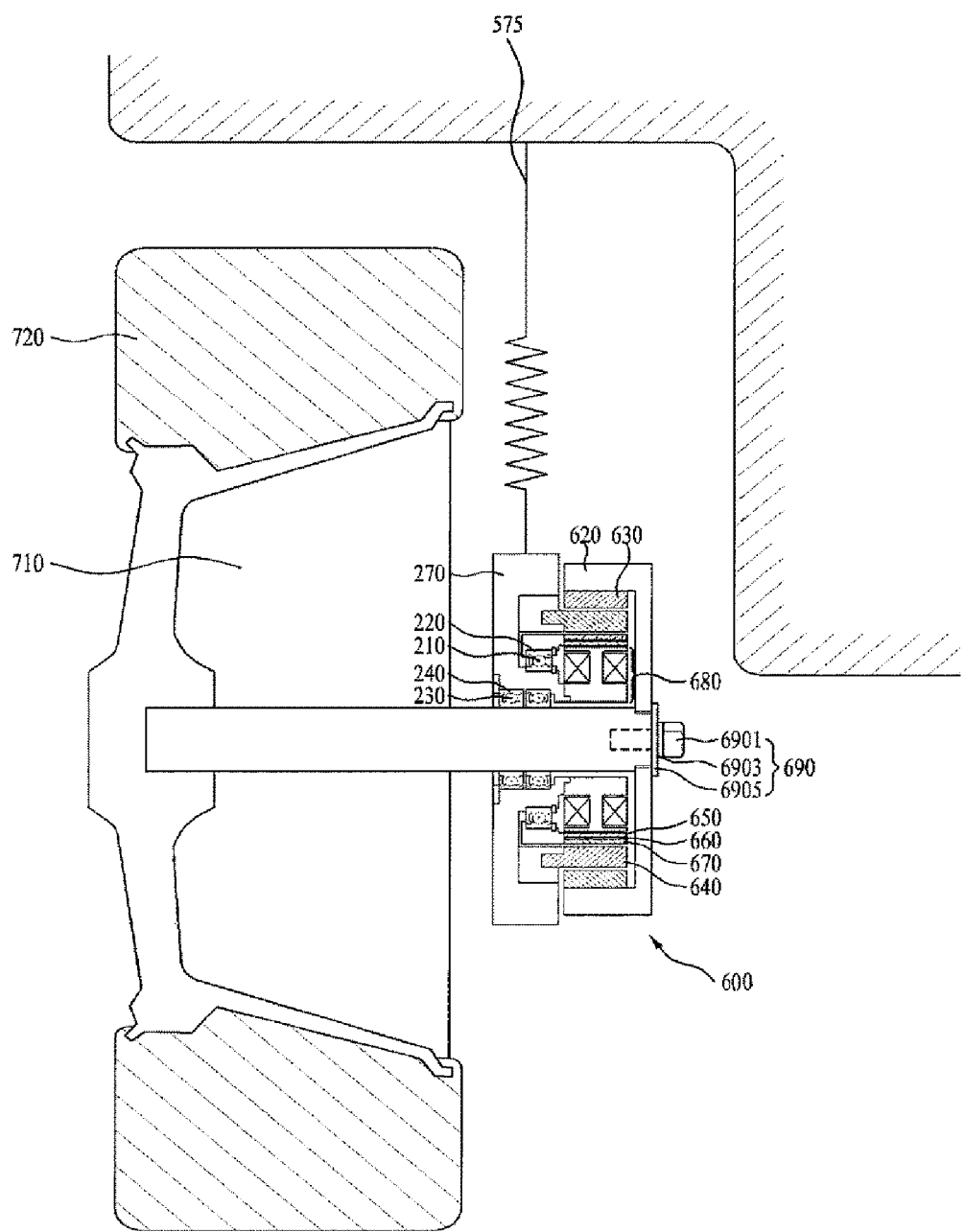

LAUNDRY TREATMENT APPARATUS AND MAGNETIC GEAR APPARATUS

CROSS-REFERENCE TO RELATED APPLICATIONS

This application is the National Phase of PCT International Application No. PCT/KR2015/010154, filed on Sep. 25, 2015, which claims priority under 35 U.S.C. 119(a) to Patent Application No. 10-2014-0188513, filed in the Republic of Korea on Dec. 24, 2014, which is hereby incorporated by reference herein in their entirety.

TECHNICAL FIELD

The present invention relates to a laundry treatment apparatus and a magnetic gear apparatus.

BACKGROUND ART

FIG. 1 is a view showing a conventional belt drive type laundry treatment apparatus.

The conventional laundry treatment apparatus shown in FIG. 1 may include a cabinet 1 defining the appearance of the laundry treatment apparatus, a tub 2 disposed in the cabinet 1 to contain washing water, and a drum 3 rotatably disposed in the tub 2 to contain laundry.

The cabinet 1 and the tub 2 include an introduction port for allowing the inside thereof to communicate with the outside thereof. The laundry treatment apparatus further includes a door 11 for opening and closing the introduction port.

The cabinet 1 further includes springs 4 and a damper 5 to attenuate vibrations generated by the rotation of the drum 3.

The laundry treatment apparatus further includes a power unit 6.

The power unit 6 includes a motor 64 for generating rotational force, a first pulley 62 rotatable by the rotational force generated by the motor 64, a second pulley 63 having a larger diameter than the first pulley 62, a belt 65 for causing the first and second pulleys 62 and 63 to rotate together, and a shaft 61, which is integrally formed at one end thereof with one side of the second pulley 63 and at the other end thereof with the drum 3 to transfer the rotational force generated by the power unit 6 to the drum 3.

More specifically, in order to transfer the rotational force generated from by motor 64 to the second pulley 63, which has a larger diameter than the first pulley 62, the first pulley 62 and the second pulley 63 are connected to each other via the belt 62 wound therearound. The first and second pulleys 62 and 63, which have different diameters, transfer the low-speed, high-torque rotational force to the drum 3.

The tub 2 further includes a bearing housing 22, and a bearing 21 rotatably provided in the bearing housing 22, in order to reduce the radial load generated during rotation of the shaft 61.

A conventional belt drive reduction mechanism using pulleys has a problem of generation of noise due to rotation of the belt 65. Furthermore, the reduction mechanism has a problem of breakage of the belt 65.

In addition, since space required for rotation of the belt 65 has to be ensured because the first and second pulleys 62 and 63 are provided in the cabinet 1, assembly thereof is difficult.

Furthermore, since the first pulley 62 rotates at a higher speed and the second pulley 63 rotates at a higher torque in the state in which the belt 65 is in contact with the first and second pulleys 62 and 63, friction is generated between the belt 65 and the pulleys 62 and 63, thus deteriorating the motor efficiency.

In addition, since the belt 65 is in contact with the first and second pulleys 62 and 63, there is a problem in that the motor 64 may be burned when excessive load is applied to the power unit 6.

FIG. 2 is a view showing a conventional direct-drive type laundry treatment apparatus.

The conventional laundry treatment apparatus shown in FIG. 2 may include a cabinet 10 defining the appearance of the laundry treatment apparatus, a tub 20 disposed in the cabinet 10 to contain washing water, and a drum 30 rotatably disposed in the tub 20 to contain laundry.

The cabinet 10 further includes springs 40 and a damper 50 in order to attenuate vibrations generated by the rotation of the drum 30.

The cabinet 10 and the tub 20 include an introduction port for allowing the inside thereof to communicate with the outside thereof. The laundry treatment apparatus further includes a door 101 for opening and closing the introduction port.

The laundry treatment apparatus further includes a power unit 60 for rotating the drum 30. The power unit 60 generates rotational force, and rotational force generated by the power unit 60 is transferred to a shaft 601 and is in turn transferred to the drum 30, which is configured to be rotated with the shaft 601.

The tub 2 further includes a bearing housing 202, and a bearing 201 rotatably provided in the bearing housing 202, in order to reduce the radial load generated during rotation of the shaft 601.

The power unit 60 includes a stator for generating a rotating magnetic field, and a rotor adapted to be rotated by the rotating magnetic field generated by the stator. Since the conventional direct-drive type laundry treatment apparatus shown in FIG. 2 enables only the rotation of the drum 3, it has to further include gears in order to reduce the speed and thus transfer high torque. However, since the gears are configured to transfer power in the state of being engaged with each other, there is a problem of generation of noise due to vibrations of the gears. Furthermore, when the reduction of speed is executed while the gears engage with each other, there is a problem of deterioration of efficiency.

In addition, since the gears are engaged with each other, there is a problem of burning of the motor 602.

DISCLOSURE OF INVENTION

Technical Problem

An object of the present invention devised to solve the problem lies on the provision of a magnetic gear apparatus capable of reducing noise caused by vibrations.

Another object of the present invention devised to solve the problem lies on the provision of a magnetic gear apparatus capable of eliminating defects caused by the breakage of a belt.

A further object of the present invention devised to solve the problem lies on the provision of a magnetic gear apparatus, which obviates a belt and is thus simple to assemble.

Still another object of the present invention devised to solve the problem lies on the provision of a magnetic gear apparatus, which is constructed to have no interference in operation so as to improve the efficiency of the motor.

Solution to Problem

The object of the present invention can be achieved by providing a laundry treatment apparatus including a cabinet defining an appearance of the laundry treatment apparatus, a drum rotatably disposed in the cabinet to contain laundry, and a power unit for rotating the drum, wherein the power unit includes a rotating magnetic field generator securely provided in the cabinet to generate rotating magnetic fields, an input magnetic gear part rotatably disposed radially outside the rotating magnetic field generator and including at least one permanent magnet to transfer rotating magnetic fields, a magnetic path formation part disposed radially outside the input magnetic gear, and an output magnetic gear part disposed radially outside the magnetic path formation part and including at least one permanent magnet therein.

The input magnetic gear part may include a first rotor, disposed radially outside the rotating magnetic field generator, and an input magnetic gear, disposed radially outside the first rotor.

The input magnetic gear part may further include a magnetic gap defined between the first rotor and the input magnetic gear.

The magnetic gap may be made of a highly permeable material.

The first rotor, the magnetic gap and the input magnetic gear may be configured to be rotatable together.

The output magnetic gear part may include an output magnetic gear body and an output magnetic gear magnet part, disposed on an inner surface of the output magnetic gear body and including the at least one permanent magnet, wherein the at least one permanent magnet included in the output magnetic gear magnet part may include one or more magnets, which are layered in a radial direction.

The output magnetic gear part may further include an insulating film formed on a surface of the at least one permanent magnet.

The output magnetic gear part may include an output magnetic gear body, and an output magnetic gear magnet part disposed on an inner surface of the output magnetic gear body and including the at least one permanent magnet, wherein the output magnetic gear magnet part may include an insulating film formed between the output magnetic gear magnet part and the magnetic path formation part.

The magnetic path formation part may be made of a highly permeable material.

The output magnetic gear part may include an output magnetic gear body, and an output magnetic gear magnet part disposed on an inner surface of the output magnetic gear body and including the at least one permanent magnet, wherein the output magnetic gear body is made of a highly permeable material.

The highly permeable material may be a silicon steel plate.

The highly permeable material may be a dust core.

The silicon steel plate may be layered in a direction perpendicular to a diametrical direction of the power unit.

The silicon steel plate may be layered in a diametrical direction of the power unit.

In another aspect of the present invention, provided herein is a magnetic gear apparatus including a rotating magnetic field generator, which is securely provided to generate rotating magnetic fields, an input magnetic gear part rotatably disposed radially outside the rotating magnetic field generator and including at least one permanent magnet disposed on a surface thereof that faces the rotating magnetic field generator to transfer rotating magnetic fields, a magnetic path formation part disposed radially outside the input magnetic gear to form a magnetic path, and a second rotor rotatably disposed radially outside the magnetic path formation part and including at least one permanent magnet therein.

In a further aspect of the present invention, provided herein is an electric moving apparatus including a chassis defining an appearance of the electric moving apparatus and an in-wheel motor unit provided at the chassis, wherein the in-wheel motor unit includes a rotatable wheel, a tire provided on an outer surface of the wheel, a rotating magnetic field generator, which is securely provided to generate rotating magnetic fields, an input magnetic gear part rotatably disposed radially outside the rotating magnetic field generator and including at least one permanent magnet provided on a surface thereof that faces the rotating magnetic field generator, a magnetic path formation part disposed radially outside the input magnetic gear to form a magnetic path, and an output magnetic gear part rotatably disposed radially outside the magnetic path formation part and including at least one permanent magnet therein.

Advantageous Effects of Invention

The present invention provides a magnetic gear apparatus capable of reducing noise caused by vibrations.

Furthermore, the present invention provides a magnetic gear apparatus capable of eliminating defects caused by breakage of a belt.

In addition, the present invention provides a magnetic gear apparatus, which enables its assembly to be simplified by removal of a belt.

Furthermore, the present invention provides a magnetic gear apparatus, which is constructed to have no interference in operation so as to improve the efficiency of the motor.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a view showing a conventional belt drive type laundry treatment apparatus;

FIG. 2 is a view showing a conventional direct-drive type laundry treatment apparatus;

FIG. 3 is a side view showing a laundry treatment apparatus equipped with a magnetic gear apparatus according to the present invention;

FIG. 4 is a rear view showing the laundry treatment apparatus equipped with the magnetic gear apparatus according to the present invention;

FIG. 5 is a view showing the magnetic gear apparatus according to the present invention;

FIG. 6 is a side view showing the magnetic gear apparatus according to the present invention; and FIG. 7 is a view showing an electric moving apparatus equipped with the magnetic gear apparatus according to the present invention.

BEST MODE FOR CARRYING OUT THE INVENTION

Reference will now be made in detail to the preferred embodiments of the present invention, examples of which are illustrated in the accompanying drawings.

FIGS. 3 and 4 are views showing a laundry treatment apparatus equipped with a magnetic gear apparatus according to the present invention.

Referring to FIG. 3, the laundry treatment apparatus according to the present invention includes a cabinet 100 defining the appearance of the laundry treatment apparatus, a tub 200 disposed in the cabinet 100 to contain washing water, a drum 300 rotatably disposed in the tub 200 to contain laundry, at least one spring 400 and a damper 500 for attenuating vibrations generated during the rotation of the drum 300, and a power unit 600 for rotating the drum 300.

The cabinet 100 may include a cabinet port (260) for allowing laundry to be put into and taken out of the cabinet 100, and a door 110 for opening and closing the cabinet port (not shown).

The tub 200 may include a shaft hole 250, which is provided in the power unit 600 and through which a shaft 610 for rotating the drum 300 extends, a first bearing 210 for supporting the radial load generated by the rotation of the shaft 610 extending through the shaft hole 250, a first bearing housing 220 for accommodating the first bearing 210, a first rotor 650 rotatably provided at the power unit 600, a magnetic gap 660, a second bearing 230 for withstanding the radial load generated by the rotation of an input magnetic gear 670, and a second bearing housing 240 for accommodating the second bearing 230.

The existing laundry treatment apparatus includes only one bearing and one bearing housing provided in a tub because the provision of the one bearing and the one bearing housing is sufficient to support only the radial load of the shaft for rotating the drum. However, the laundry treatment apparatus according to the present invention may further include the second bearing 230 and the second bearing housing 240 in addition to the shaft 610 because the first rotor 650, the magnetic gap 660 and the input magnetic gear 670 are rotatably provided in the power unit 600 separately from the shaft 610.

Referring to FIG. 4, the power unit 600 of the laundry treatment apparatus according to the present invention may include the shaft 610, which is rotatably provided to rotate the drum 300, an output magnetic gear part 620, which rotates with the shaft 610 to rotate the shaft 610, a magnetic path formation part 640 provided in the output magnetic gear part 620 to form a magnetic path, the first rotor 650 rotatably provided in the magnetic path formation part 640, the magnetic gap 660, the input magnetic gear 670, and a rotating magnetic field generator 680 for generating a rotating magnetic field and supplying the rotating magnetic field to the first rotor 650.

The output magnetic gear part 620 may include an output magnetic gear body 625 and an output magnetic gear magnet 630, provided in the output magnetic gear body 625 and including at least one permanent magnet.

The first rotor 650, the magnetic gap 660 and the input magnetic gear 670 may be rotated together by the rotating magnetic field supplied from the rotating magnetic field generator 680.

The rotating magnetic field generator 680 may include a body 681, magnetic teeth 683 radially protruding from the body 681, and a coil 685 provided at the magnetic teeth 683.

The magnetic teeth 683 may include protrusions 6831 radially protruding from the body 681, and flat portions 6833 provided at the ends of the protrusions 6831 to face the first rotor 650.

Since the rotating magnetic field generator 680 according to the present invention is identical to a usual rotating magnetic field generator, which is widely used in the art, a detailed description thereof is omitted.

FIGS. 5 and 6 are views showing the magnetic gear apparatus according to the present invention.

The operating principle of the magnetic gear apparatus according to the present invention will now be described in detail with reference to FIGS. 5 and 6. The magnetic gear apparatus includes the rotating magnetic field generator 680, which is positioned at an innermost radial position.

The first rotor 650 may be provided radially outside the rotating magnetic field generator 680 with an air gap defined therebetween such that the first rotor 650 does not contact the rotating magnetic field generator 680.

The width of the air gap is preferably small so as to efficiently the transfer magnetic field generated by the rotating magnetic field generator 680 to the first rotor 650.

The magnetic gap 660 and the input magnetic gear 670 may be provided radially outside the first rotor 650.

As shown in FIG. 5, the surface of the first rotor 650, which faces the rotating magnetic field generator 680, may be provided with a plurality of magnets. The first rotor 650 is rotated by the rotating magnetic field generated by the rotating magnetic field generator 680.

The input magnetic gear 670 may also be provided radially outside the first rotor 650. The input magnetic gear 670 may rotate with the first rotor 650 upon rotation of the first rotor 650. The outer radial surface of the input magnetic gear 670 may be provided with at least one permanent magnet.

The magnetic gap 660 may be provided between the input magnetic gear 670 and the first rotor 650.

The magnetic gap 660 may be made of a highly permeable material. When the magnetic gap 660 contacts the permanent magnet in a surface contact manner, the magnetic force directed toward the facing surface of the permanent magnet is increased, and the magnetic force directed outward from the highly permeable material, that is, outward from the permanent magnet, is decreased.

Accordingly, since the magnetic gap 660 made of a highly permeable material is provided between the first rotor 650 and the input magnetic gear 670, the rotating magnetic field generated by the rotating magnetic field generator 680 has an influence on the first rotor 650.

Since the first rotor 650, the magnetic gap 660 and the input magnetic gear 670 are constructed to rotate together, the input magnetic gear 670 may very efficiently transfer the magnetic force to the output magnetic gear magnet 630 upon rotation of the first rotor 650. In other words, there is an effect of amplification of magnetic force.

More specifically, since there is almost no magnetic force in the spaces other than the spaces between the magnetic gears due to the amplification of magnetic force, it is possible to prevent operational malfunctions of electronic devices mounted on the laundry treatment apparatus, which would otherwise be caused by the magnetic force.

The magnetic gap 660 may be made of SUS430, SS400, soft iron, or the like, which are highly permeable materials.

The outer radial surface of the input magnetic gear 670 may be provided with the permanent magnets such that the permanent magnets are positioned at teeth of the input magnetic gear 670. The permanent magnets may be disposed such that one permanent magnet is oriented such that the N pole thereof faces radially outward and the permanent magnet adjacent to the one permanent magnet is reversely oriented such that the S pole thereof faces radially outward.

As a result, the N poles and the S poles may be alternately disposed along the outer radial surface of the input magnetic gear 670.

Alternatively, in order to alternately dispose the N poles and S poles of the permanent magnets along the outer radial surface of the input magnetic gear 670, that is, in order to alternately dispose the magnetic fields of the N poles and S poles of the permanent magnets, which face toward the output magnetic gear part 620 disposed radially outside the input magnetic gear 670, all of the permanent magnets may be disposed in the same orientation such that the N poles of all of the permanent magnets face radially outward of the input magnetic gear 670 but the permanent magnets are removed at every second place, rather than disposing at those places the permanent magnets with the S poles facing radially outward, so as to leave a space at every second place.

Considering the distribution of magnetic fields of the alternative solution, since magnetic fields of the S pole are present in the spaces adjacent to the permanent magnets, the N poles of which face radially outward, the number of permanent magnets may be reduced by half.

The number of magnetic poles of the input magnetic gear 670 may be the same as that of the first rotor 650. The correspondence between the numbers of magnetic poles of the input magnetic gear 670 and the first rotor 650 leads to simplification of the structure, and enables the magnetic forces of magnets of the input magnetic gear 670 and the first rotor 650 to be bound with each other, thus increasing the total magnetic force.

The input magnetic gear 670 may transfer power to the output magnetic gear part 620, which is disposed radially outside the input magnetic gear 670. The output magnetic gear part 620 may include the output magnetic gear magnet part 630, which is provided on the inner radial surface of the output magnetic gear part 620.

Accordingly, the permanent magnets of the input magnetic gear 670 and the output magnetic gear magnet part 630 may serve as the teeth of gears, even though they do not engage with each other.

The output magnetic gear body 625 may be made of a highly permeable material. When the output magnetic gear body 625 and the output magnetic gear magnet part 630 are in contact with each other in a surface contact manner, the magnetic force directed toward the facing surface of the at least one permanent magnet, provided at the output magnetic gear magnet part 630, is increased, and the magnetic force directed radially outward of the output magnetic gear part 620 made of highly permeable material, that is, radially outward of the permanent magnet, is decreased.

Since the first rotor 650, the magnetic gap 660 and the input magnetic gear 670 are constructed to rotate together, the input magnetic gear 670 may very efficiently transfer the magnetic force to the output magnetic gear magnet part 630 when the first rotor 650 rotates. In other words, there is an effect of amplification of magnetic force.

More specifically, since there is almost no magnetic force in the spaces other than the spaces between the magnetic gears due to the amplification of magnetic force, it is possible to prevent operational malfunctions of electronic devices mounted on the laundry treatment apparatus, which would otherwise be caused by the magnetic force.

The output magnetic gear body 625 may be made of SUS430, SS400, soft iron, or the like, which are highly permeable materials.

The reduction gear ratio may be determined by a ratio of the number of poles of the permanent magnet part of the input magnetic gear 670 to the number of poles of the permanent magnets provided at the output magnetic gear magnet part 630. Since the reduction gear ratio and transmission of torque are well known to those skilled in the art, a description thereof is omitted.

The magnetic path formation part 640 may be disposed in the input magnetic gear 670 and the output magnetic gear magnet part 630.

Since the input magnetic gear 670 rotates together with the first rotor 650 and the magnetic gap 660, it is possible to transfer the rotating magnetic field generated by the rotating input magnetic gear 670 to the output magnetic gear magnet 630 at a predetermined reduction gear ratio.

Although the magnetic path formation part 640 may be constructed to be rotatable, the magnetic path formation part 640 is preferably constructed to be stationary in the case in which the output magnetic gear part 620 has to be rotated, as in this embodiment.

The magnetic path formation part 640 may form magnetic paths so as to transfer the rotating magnetic field, generated by the rotating input magnetic gear 670, to the output magnetic gear magnet part 630.

Since the magnetic path formation part 640 is a component for forming magnetic paths, the magnetic path formation part 640 is preferably made of a highly permeable material. In a more preferable embodiment, the magnetic path formation part 640 is made of a material that does not generate eddy current.

If the magnetic path formation part 640 is made of a material, such as iron, which has high permeability and generates eddy current, during the rotation of the input magnetic field gear 670, eddy current is generated by the surfaces of the permanent magnets provided at the input magnetic gear 670 and the surface of the magnetic path formation part 640, and rotational energy is thus converted into thermal energy, thus causing energy loss.

Therefore, the magnetic path formation part 640 is more preferably made of a stacked structure constituted by layered silicon steel plates or a dust core.

Since the output magnetic gear magnet part 630 serves as a so-called output magnetic gear corresponding to the input magnetic gear 670, the N poles and the S poles of the output magnetic gear magnet part 630, which face radially inward, may be alternately disposed in the same manner as the disposition of the permanent magnets of the input magnetic gear 670.

Alternatively, in order to reduce the number of permanent magnets and thus production costs, all of the permanent magnets may be disposed in the same orientation such that the N poles of all of the permanent magnets face radially inward from the output magnetic gear magnet part 630 but the permanent magnets are removed at every second place, rather than disposing at those places the permanent magnets with the S poles facing radially inward, so as to leave a space at every second place. In addition, the permanent magnets may further be provided at the outer radial surfaces thereof with permanent magnets with the N poles facing radially inward.

The number of poles of the output magnetic gear magnet part 630 and the number of poles of the input magnetic gear 670 are not limited to those shown in the drawings, but may be changed so as to obtain a desired reduction gear ratio.

Air gaps may be provided between the output magnetic gear magnet part 630 and the magnetic path formation part 640 and between the magnetic path formation part 640 and the input magnetic gear 670 such that the facing surfaces therebetween do not contact each other, as in the case of the first rotor 640 and the rotating magnetic field generator 680.

The smaller the air gaps are, the more efficiently the magnetic forces are employed. Therefore, the air gaps are preferably configured to have a small width.

The air gaps may have a width of 0.1 mm-0.5 mm.

FIG. 5(*a*) shows a permanent magnet provided in the output magnetic gear magnet part 630.

As described above, since the input magnetic gear 670 is rotatable, eddy current may be generated while the rotating magnetic fields generated by the input magnetic gear 670 are transferred to the output magnetic gear magnet part 630 through the magnetic path formation part 640.

Eddy currents are circular electric currents induced within conductors by an abruptly changing magnetic field in the conductor.

Eddy currents have problems of decreased efficiency of motors or magnetic gear apparatuses. The construction of the present invention, which is designed to solve the problems, is described in detail with reference to FIG. 5.

Eddy current loss may be determined by the formula below.

$$P_e = K_e \frac{(tfB_m)^2}{\rho}$$

wherein Pe is eddy current loss, and t is the thickness of a steel plate.

As shown in FIG. 5(*a*), in order to prevent the eddy current loss, each of the permanent magnets provided at the inner surface of the output magnet gear magnet part 630 may include a first magnet 631, a second magnet 633 and a third magnet 635.

As shown in FIG. 5(*a*), each of the permanent magnets is composed of the first magnet 631, the second magnet 633 and the third magnet 635, which are layered in the radially inward direction of the output magnetic gear magnet part 630, and thus the thickness of the permanent magnet is reduced, thus reducing eddy current loss.

The first magnet 631, the second magnet 633 and the third magnet 635 may include coating films thereon so as to reduce eddy current loss.

FIG. 5(*b*) shows another embodiment of reducing eddy current loss.

As shown in FIG. 5(*b*), at least one permanent magnet provided at the output magnetic gear magnet part 630 may include an insulating film 637 formed on the inner radial surface thereof.

Like the embodiment shown in FIG. 5(*a*), the permanent magnet of the output magnetic gear magnet part 630 may include an insulating film 637 formed on the inner radial surface thereof so as to reduce eddy current loss.

Referring to FIG. 6, for the amplification of magnetic force, the magnetic gap 660, the magnetic path formation part 640 and the output magnetic gear body 625 may be made of a highly permeable material.

When eddy current is generated by the components made of a highly permeable material, the highly permeable material may include a silicon steel plate or a dust core.

When the components made of highly permeable material are layered with a silicon steel plate, the silicon steel plate may be layered in the x axis direction, thereby efficiently reducing eddy current loss.

Alternatively, the components made of highly permeable material may be layered with a silicon steel plate in the y axis direction.

The lamination of the silicon steel plate or the like in the y axis direction contributes to mass production or efficient utilization of materials.

As shown in FIG. 6, the output magnetic gear part 620 may be configured to rotate with the shaft 610. The output magnetic gear part 620 may further include a fastening unit 690 for fastening the output magnetic gear part 620 to the shaft 610.

The fastening unit 690 may include a support plate 6905 disposed on the outer surface of the output magnetic gear part 620, a fastening bolt 6901 fitted in the support plate 6905 to fasten the second rotor 620 to the shaft 610, and a washer 6903 disposed between the fastening bolt 6901 and the support plate 6905.

Consequently, the output magnetic gear part 620 may rotate with the shaft 610 by virtue of the fastening unit 690.

FIG. 7 shows the magnetic gear apparatus according to the present invention, which is installed on the wheel of an electric moving apparatus.

Referring to FIG. 7, the electric moving apparatus may include a chassis 800 defining the electric moving apparatus, an in-wheel motor unit 700 disposed under the chassis 800, and a spring 400 for attenuating vibrations generated by the in-wheel motor unit 700.

The in-wheel motor unit 700 may include a rotatable wheel 710, a tire 720 provided on the outer surface of the wheel 710, and the power unit 600 for rotating the wheel 710.

Since the power unit 600 is constructed in the same manner as in the magnetic gear apparatus described with reference to FIGS. 3 to 6, the descriptions thereof are omitted.

Direct-drive type electric moving apparatuses, such as electric vehicles, electric scooters and electric wheelchairs, frequently require speed reduction as necessary.

Accordingly, when the magnetic gear apparatus according to the present invention is mounted on the direct-drive type electric moving apparatus, it is possible to eliminate mechanical loss and to efficiently transfer power generated by the power unit.

MODE FOR THE INVENTION

Various embodiments have been described in the best mode for carrying out the invention.

INDUSTRIAL APPLICABILITY

The present invention provides a magnetic gear apparatus capable of reducing noise caused by vibrations.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A magnetic gear apparatus comprising:
   a rotating magnetic field generator, which is securely located in the magnetic gear apparatus to generate rotating magnetic fields;
   an input magnetic gear part rotatably disposed radially outside the rotating magnetic field generator and including at least one permanent magnet disposed on a surface thereof that faces the rotating magnetic field generator to transfer rotating magnetic fields;

a magnetic path formation part disposed radially outside the input magnetic gear to form a magnetic path, the magnetic path formation part being configured to remain stationary;

a second rotor rotatably disposed radially outside the magnetic path formation part and including at least one permanent magnet therein; and a shaft that is configured to connect with the second rotor and that is configured to rotate along with rotation of the second rotor to transmit rotational power.

2. The magnetic gear apparatus according to claim 1, wherein the input magnetic gear part comprises:

a first rotor disposed radially outside the rotating magnetic field generator; and an input magnetic gear disposed radially outside the first rotor.

3. The magnetic gear apparatus according to claim 2, wherein the input magnetic gear part further comprises a magnetic gap disposed between the first rotor and the input magnetic gear.

4. The magnetic gear apparatus according to claim 3, wherein the magnetic gap is made of a highly permeable material.

5. The magnetic gear apparatus according to claim 3, wherein the first rotor, the magnetic gap and the input magnetic gear are configured to be rotatable together.

6. The magnetic gear apparatus according to claim 1, further comprising an output magnetic gear part, wherein the output magnetic gear part comprises:

an output magnetic gear body; and an output magnetic gear magnet part disposed on an inner surface of the output magnetic gear body and including the at least one permanent magnet, wherein the at least one permanent magnet included in the output magnetic gear magnet part includes one or more magnets, which are layered in a radial direction.

7. The magnetic gear apparatus according to claim 6, wherein the output magnetic gear part further comprises an insulating film formed on a surface of the at least one permanent magnet.

8. The magnetic gear apparatus according to claim 1, further comprising an output magnetic gear part, wherein the output magnetic gear part comprises:

an output magnetic gear body; and an output magnetic gear magnet part disposed on an inner surface of the output magnetic gear body and including the at least one permanent magnet, wherein the output magnetic gear magnet part includes an insulating film formed between the output magnetic gear magnet part and the magnetic path formation part.

9. The magnetic gear apparatus according to claim 1, wherein the magnetic path formation part is made of a highly permeable material.

10. The magnetic gear apparatus according to claim 1, further comprising an output magnetic gear part, wherein the output magnetic gear part comprises:

an output magnetic gear body; and an output magnetic gear magnet part disposed on an inner surface of the output magnetic gear body and including the at least one permanent magnet, wherein the output magnetic gear body is made of a highly permeable material.

11. The magnetic gear apparatus according to claim 4, wherein the highly permeable material is a silicon steel plate.

12. The magnetic gear apparatus according to claim 4, wherein the highly permeable material is a dust core.

13. The magnetic gear apparatus according to claim 11, wherein the silicon steel plate is layered in a direction perpendicular to a diametrical direction of a power unit.

14. The magnetic gear apparatus according to claim 11, wherein the silicon steel plate is layered in a diametrical direction of a power unit.

* * * * *